United States Patent
Yuknewicz et al.

(10) Patent No.: US 7,610,258 B2
(45) Date of Patent: Oct. 27, 2009

(54) SYSTEM AND METHOD FOR EXPOSING A CHILD LIST

(75) Inventors: Paul Yuknewicz, Redmond, WA (US); Antoine Cote, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 10/768,526

(22) Filed: Jan. 30, 2004

(65) Prior Publication Data

US 2005/0171925 A1    Aug. 4, 2005

(51) Int. Cl.
G06F 7/00     (2006.01)
G06F 17/30    (2006.01)
G06F 17/00    (2006.01)

(52) U.S. Cl. .............................. 707/1; 707/10; 707/100
(58) Field of Classification Search ................. 715/853, 715/854; 717/101; 700/121; 345/853
See application file for complete search history.

(56) References Cited

U.S. PATENT DOCUMENTS

| | | | | |
|---|---|---|---|---|
| 4,674,065 A | | 6/1987 | Lange et al. ................. 364/900 |
| 4,851,988 A | * | 7/1989 | Trottier et al. ............... 709/226 |
| 5,267,155 A | | 11/1993 | Buchanan et al. ...... 364/419.14 |
| 5,392,386 A | | 2/1995 | Chalas ........................ 395/155 |
| 5,806,066 A | * | 9/1998 | Golshani et al. ............. 707/100 |
| 5,812,135 A | * | 9/1998 | Kotchey ....................... 715/853 |
| 5,815,830 A | | 9/1998 | Anthony ......................... 707/6 |
| 5,838,319 A | * | 11/1998 | Guzak et al. ................. 715/854 |
| 5,859,636 A | | 1/1999 | Pandit ........................... 345/335 |
| 5,946,647 A | | 8/1999 | Miller et al. ..................... 704/9 |
| 5,987,463 A | * | 11/1999 | Draaijer et al. ................. 707/10 |
| 6,073,137 A | * | 6/2000 | Brown et al. .............. 707/104.1 |
| 6,085,201 A | | 7/2000 | Tso ........................... 707/505 |
| 6,122,647 A | | 9/2000 | Horowitz et al. ............. 707/513 |
| 6,271,846 B1 | * | 8/2001 | Martinez et al. ............. 715/854 |
| 6,305,008 B1 | | 10/2001 | Vaidyanathan et al. .......... 717/4 |
| 6,311,323 B1 | | 10/2001 | Shulman et al. .............. 717/111 |
| 6,367,068 B1 | | 4/2002 | Vaidyanathan et al. .......... 717/8 |
| 6,424,358 B1 | * | 7/2002 | DiDomizio et al. .......... 715/762 |
| 6,502,233 B1 | | 12/2002 | Vaidyanathan et al. ....... 717/101 |
| 6,609,133 B2 | * | 8/2003 | Ng et al. .................... 707/103 Y |
| 6,636,250 B1 | * | 10/2003 | Gasser ........................ 715/853 |
| 6,826,443 B2 | * | 11/2004 | Makinen ...................... 700/121 |
| 2003/0081013 A1 | * | 5/2003 | Allen et al. .................. 345/853 |
| 2003/0234816 A1 | * | 12/2003 | Rosen et al. ................. 345/762 |
| 2004/0003371 A1 | * | 1/2004 | Coulthard et al. ........... 717/101 |
| 2004/0073539 A1 | * | 4/2004 | Dettinger et al. ................ 707/3 |

OTHER PUBLICATIONS

Abiteboul, S. et al., "A Logical View of Structured Files", *The VLDB Journal*, 1998, 7, 96-114.

(Continued)

*Primary Examiner*—Charles Rones
*Assistant Examiner*—Charles D Adams
(74) *Attorney, Agent, or Firm*—Woodcock Washburn LLP

(57) ABSTRACT

An interface may be provided that enables the user to select a parent list, to view a set of available child lists corresponding to the selected parent list, and to select a particular child list from the set of available child lists. The set of available child lists may be automatically compiled in response to the selection of the parent list. Another interface may be provided that enables the user to select a particular portion of the parent list for which to view corresponding child data. The corresponding child data may be automatically identified and displayed in a running application.

10 Claims, 7 Drawing Sheets

OTHER PUBLICATIONS

Anderson; K.M. et al., "Chimera: Hypertext for Heterogeneous Software Environments", *ECHT Proceedings*, Sep. 1994, 94-107.

Breidenbach, G., "Programmable Keyboard Controller", *Electronic Praxis*, 2001, 6, 68-70 (English Language Abstract).

Hayes, P.J. et al., "A Logical View of Types", *Association for Computing Machinery*, 1980, 128-130.

Henninger, S. et al., "A Tool for Managing Software Development Knowledge", *PROFES*, 2001, LNCS 2188, 182-195.

Holmes, N., "Seven Great Blunders of the Computing World", *Computer*, 2002, 110-112.

Hughes, G. et al., "Microsoft Smart Tags: Support, ignore or condemn them?", *HT*, 2002, 80-81.

Jewell, D. "Windows Shell Secrets", *EXE*, 1999, 13(9), 35-45.

Kramer, B. "3D LISP Tools", *Cadence*, 1989, 4(5), 130-134.

Kucza, T. et al., "Improving Knowledge Management in Software Reuse Process", *PROFES*, 2001, LNCS 2188, 141-152.

Lewis, P.H. et al., "Media-based Navigation with Generic Links", *Hypertext*, 1996, 215-223.

Lin, C.F. et al., "Chinese Text Distinction and Font Identification by Recognizing most Frequently Used Characters", *Image and Vision Computing*, 2001, 19, 329-338.

Middel, C.D., "Software Configuration and Change Management", *Proceedings 5$^{th}$ Conference on Quality Engineering in Software Technology*, 2001, 239-245 (English Language Abstract).

Zagler, W.L., "Text Generation for Disabled Persons Using Word Prediction", *OEGAI-Journal*, 2001, 20(2), 21-22 (English Language Abstract).

IBM Research/Eclipse, http://www.research.ibm.com/eclipse, Home page ,2 pages.

JetBrains IntelliJ IDEA—the best Java IDE around, http://www.intellij.com, 1 page.

Slickedit;Code Editor, C++ Editor, Java Editor, HTML Editor, XML Editor, Unicode Editor, http://www.slickedit.com, 1 page.

Source Insight Program Editor and Analyzer, http://www.sourcedyn.com/index.html, 2 pages.

Borland, CodeWright—The Programmer's Editing System, http://www.premia.com, 1 page.

Chalmers-Physical Resource Theory, "The Complex Adaptive Systems Programmer of year 2000", http://www.frt.fy.chalmers.se/kristian/software.html, 1 page.

Emacs/W3 v 4.0, http://www.cs.indiana.edu/elisp/w3/docs.html, 1 page.

Vi: A Unix text editor, http://www.indiana.edu/~ucspubs/b104/ztoc.html, 8 pages.

MacroMedia, Inc., Director MX, Using Director, Copyright © 2004, Macromedia, Inc., 496 pages.

Willisson, Pace, et al., ISPELL: UNIX Man Pages, Aug. 23, 2003, 73 pages.

SED(1), BSD Reference Manual, sedMan.txt, 6 pages.

McMahon, L.E., "SED—A Non-Interactive Text Editor", *Bell Laboratories*, Aug. 15, 1978, 10 pages.

The Complete Red Hat® Linux™ Operating System 5.2 Deluxe, Macmillan Digital Publishing, U.S.A., 385 pages.

CoStar User's Manual, "For AddressMate and AddressMate Plus", CoStar Corp., 1994-1995, pp. 1-1 thru Index-210.

Beitner, N.D. et al., "Multimedia Support and Authoring in Microcosm: An Extended Model", Department of Electronics and Computer Science, University of Southampton, 12 pages.

IBM Research Disclosure #368, "Multimedia Hyperlinks Automatically Created for Reference Documents", Jun. 1993, 5 pages.

Microsoft® Office 97 User's Manual, "Getting Results with Microsoft® Office 97—Real World Solutions for the Work You Do", 1997, 1-703.

Corel® Corporation Limited, Corel® InfoCentral User's Manual, 1996, vol. 1, Version 7.0 , 1996, 1 thru 86.

Corel® Office Professional 7 Quick Results, 1-531.

Novell® GroupWise™ User's Guide for Windows 16-Bit, Version 5.2, 1993-1997, 1-231.

Novell® Group Wise™ User's Guide for Windows 32-Bit, 1998, Novell, Inc., 1-318.

Claris for Macintosh, Claris Emailer Getting Started, 1995-1997, Claris Corporation, 61 pages.

Developer's Guide to Apple Data Detectors—For Version 1.0.2, © Apple Computer, Inc., 1997, 1-34.

Apple Data Detectors User's Manual, © 1997 Apple Computer, Inc., 1-16.

Nardi, B.A. et al., "Collaborative, Programmable Intelligent Agents", Mar. 1998, Apple Computer advanced Technology Group, 1-11.

U.S. Appl. No. 10/178,680, filed Jun. 24, 2002, Jeffrey Reynar.

U.S. Appl. No. 10/779,298, filed Feb. 13, 2004, Svetlana, L.

\* cited by examiner

SYSTEM AND METHOD FOR EXPOSING A CHILD LIST

REFERENCE TO RELATED APPLICATIONS

This application is related by subject matter to U.S. patent application Ser. No. 10/769,637 entitled "System and Method for Providing a Logical View of a Data Source" filed on Jan. 30, 2004, U.S. patent application Ser. No. 10/768,525 entitled "System and Method for Generating a Parameterized Query" filed on Jan. 30, 2004, and U.S. patent application Ser. No. 10/768,522 entitled "System and Method for Exposing Tasks in a Development Environment" filed on Jan. 30, 2004, the contents of which are hereby incorporated by reference in their entirety.

FIELD OF THE INVENTION

The present invention relates to the field of data retrieval and manipulation and, more specifically, to exposing a child list that is related to a selected parent list.

BACKGROUND OF THE INVENTION

A development tool such as, for example, VISUAL STUDIO™ from Microsoft Corp. of Redmond, Wash., enables development of a wide range of computing applications. Such applications may include, for example, web applications, extensible markup language (XML) applications, and traditional client applications. If an application is data-driven, then the application may have one or more associated data sources. Such data sources may be for example, databases, web services, extensible markup language (XML) documents, and business objects. Such data sources may be used to categorize, organize, and maintain lists that are useful to an application. To assist in the development process, the development tool enables the user to view, manage, and manipulate lists within such data sources. The term list, as used herein, refers to any ordered set of data such as, for example, a data table.

It is often desirable for a user to view and manage data from a number of related lists. Specifically, such lists may have a parent child relationship with one another. For example, a parent "Customers" list may store a number of records each corresponding to a particular customer. Each such record may include data for a set of customer attributes such as, for example, a customer identifier ("ID"), a name, and a zip code. The customer ID attribute in the Customers list is a distinct lookup key referred to as a primary key. Such customer attributes may correspond to the columns of the Customers list. The parent Customers list may be related to a child "Orders" list that stores a number of records each corresponding to a particular order. Each such record may include data for a set of order attributes such as, for example, an order ID, a customer ID, and a price. The customer ID attribute of the Orders list is a look up value in a foreign table, which is referred to as a foreign key. Such order attributes may correspond to the columns of the Orders list. A common operation that is performed with respect to such parent and child lists is to retrieve child data for a selected parent record. For example, a user may request data for all orders that have been placed by a selected customer. To identify such orders, the customer ID for the selected customer may be first looked up from the Customers list and then cross referenced against data for the customer ID attribute in the Orders list.

Conventional development tools may enable the user to view and manage child data through a series of complex manual steps. For example, the user may import a parent list and a related child list from a data source. The user may explicitly define a relationship between the lists within the development tool. The user may then add display controls to the development tool and bind the display controls to the lists. Finally, the user may write parameterized code to retrieve records within the child list that correspond to a selected parent record.

The execution of the steps set forth above is often a time consuming and tedious process that is likely to require a strong proficiency with the development tool. Thus, there is a need in the art for an automated task for exposing a child list. It is desired that the task may provide a simple user interface that enables the user to select a parent list, to view a set of available child lists corresponding to the selected parent list, and to select a particular child list from the set of available child lists. It is further desired that the set of available child lists be automatically compiled in response to the selection of the parent list. It is further desired that the task provide another user interface that enables the user to select a particular portion of the parent list for which to view corresponding child data. It is further desired that the corresponding child data may be automatically obtained in response to the selection of the portion of parent the list. Other features and advantages of the invention may become apparent from the following detailed description of the invention and accompanying drawings.

SUMMARY OF THE INVENTION

Systems and methods for exposing a child list are disclosed. An interface may be provided that enables a user to select a parent list. In response to the selection of the parent list, a set of available child lists that are related to the selected parent list may be identified. The set of available child lists may be identified by examining a local schema. The set of available child lists may also be identified by examining a remote schema of a data source in which the selected parent list is stored. A user interface may be provided that enables the user to select a particular child list from the set of available child lists.

According to an aspect of the invention, it may be determined if the schema for the selected child list is available locally. If the schema for the selected child list is not available locally, then it may be retrieved from the remote data source schema. The retrieved remote data source schema may be merged with the local schema.

According to another aspect of the invention, a user interface may be provided that enables the user to select a portion of the parent list for which to view corresponding child data. Upon selecting the portion of the parent list, a corresponding portion of the child list may be automatically identified. The corresponding portion of the child list may be identified by, for example, defining a relationship between the parent and the child list. The corresponding portion of the child list may also be identified by, for example, determining query parameters based on the attributes of the selected portion of the parent list, generating parameterized code including the query parameters; and querying the child list with the parameterized code. Upon being identified, the selected portion of the child list may be displayed in a running application.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

We will now explain the present invention with reference to presently preferred, exemplary embodiments. We will first describe illustrative computing and development environments in which the invention may be practiced, and then we will describe presently preferred implementations of the invention.

Illustrative Computer Environment

Figure 1:
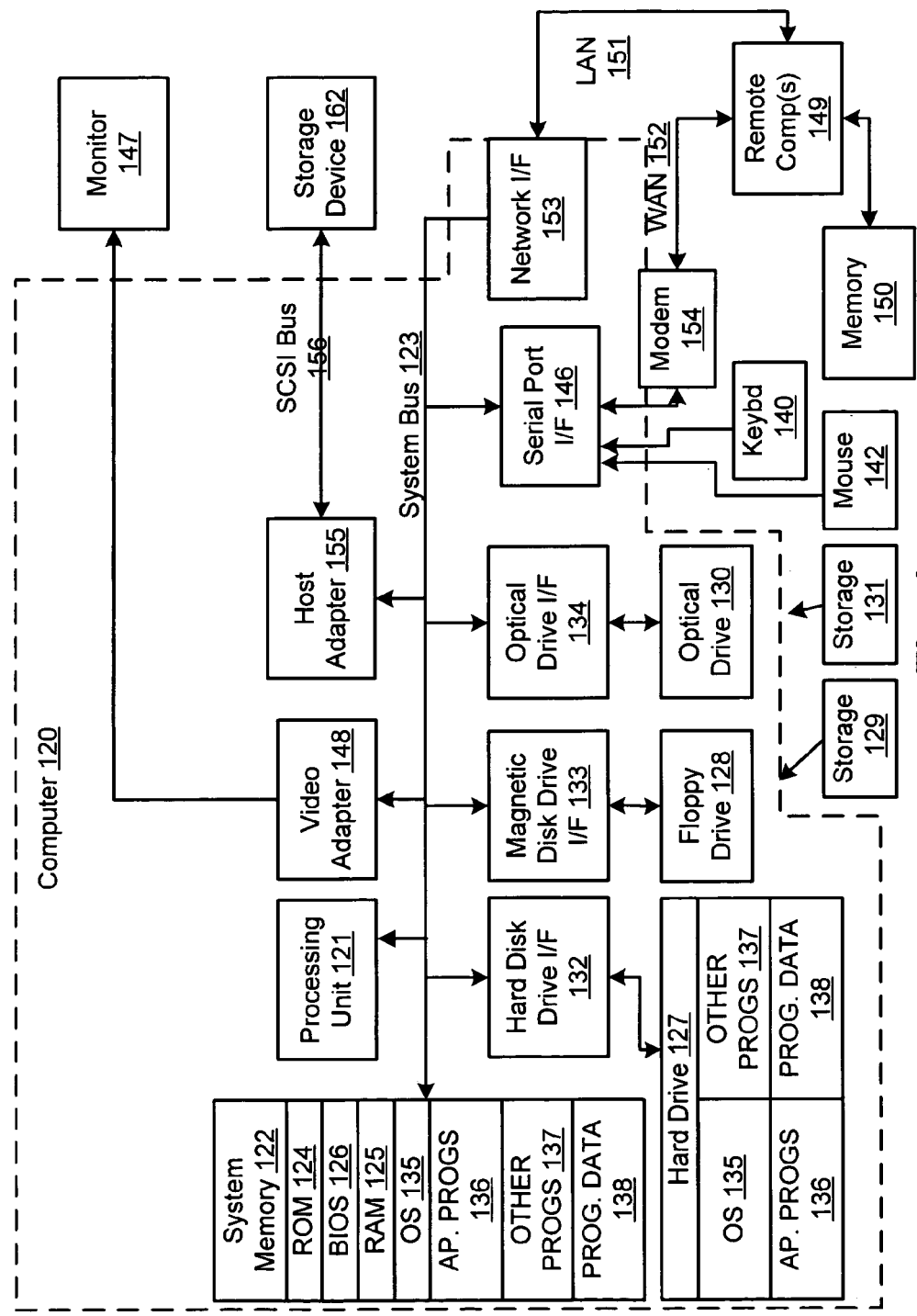
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or an application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156 The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Systems and Methods of the Present Invention

Figure 2:
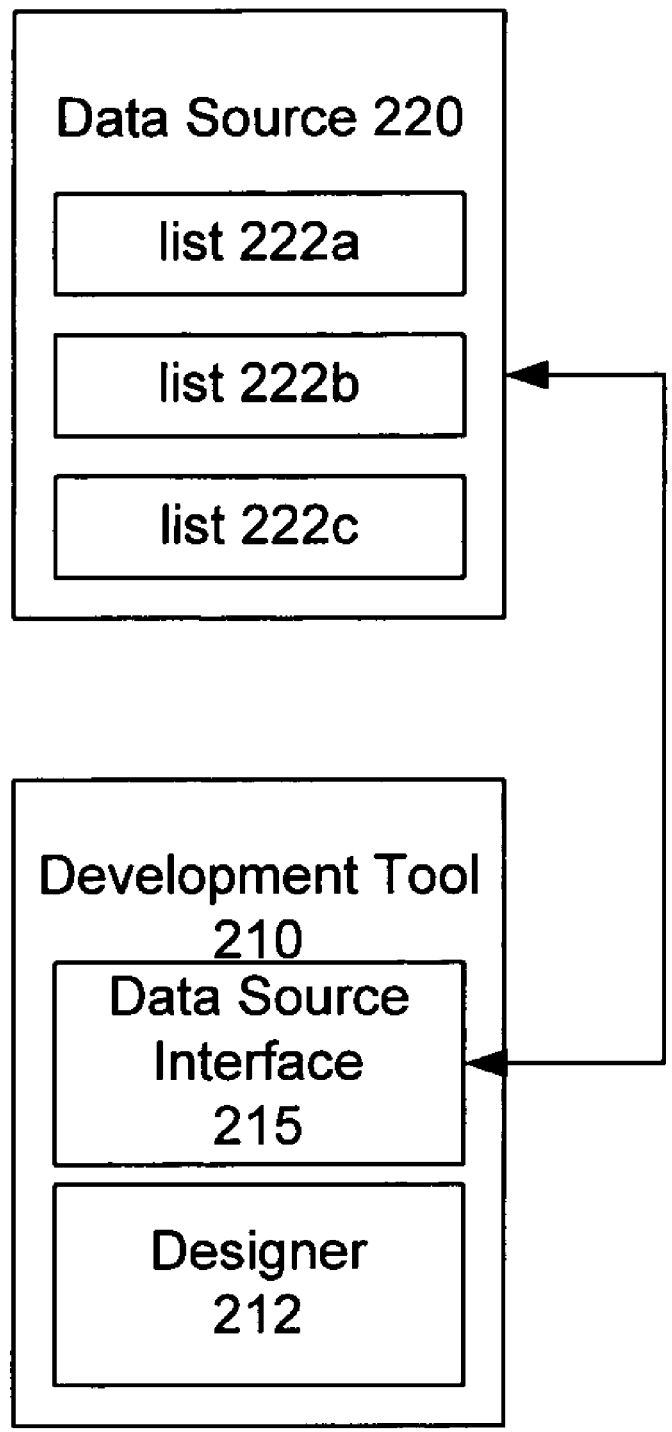
FIG. 2 is a block diagram of an exemplary development environment in accordance with the present invention.

An exemplary development environment 200 in accordance with the present invention is shown in FIG. 2. Generally, development tool 210 enables the development of computing applications. Data source 220 operates in connection with development tool 210 to categorize, organize, and maintain data that is useful to applications. Data source 220 may be for example, a database, a web service, an extensible markup language (XML) document, or an object.

Data source 220 includes Customers list 222a, Orders list 222b, and Employees list 222c. As should be appreciated, data source 222 may include any number of lists each including any type of data in addition to or in place of list 222a-c. "Customers" list 222a includes a number of records each corresponding to a particular customer. Exemplary data for Customers list 222a is shown below in Table 1:

TABLE 1

| Customer ID | Name | Zip Code |
|---|---|---|
| 1 | Jim | 00001 |
| 2 | Bill | 00002 |

As shown in Table 1, the Customers list 222a has three columns which correspond to three customer attributes: customer ID, name, and zip code. The Customer ID attribute is a distinct lookup key referred to as a primary key. Customers list 222a includes two records for Customers "1" and "2".

Exemplary data for Orders list 222b is shown below in Table 2:

TABLE 2

| Order ID | Customer ID | Price |
|---|---|---|
| A | 1 | 10 |
| B | 1 | 20 |
| C | 1 | 30 |
| D | 2 | 15 |
| E | 2 | 25 |

As shown in Table 2, Orders list 222b has three columns which correspond to three order attributes: order ID, customer ID, and order price. The customer ID attribute of the Orders list 222b is a look up value in a foreign table, which is referred to as a foreign key. Orders list 222a includes five records for Orders "A" through "E". Orders "A" through "C" have been placed by Customer "1", while Orders "D" and "E" have been placed by Customer "2". Data for Employees list 222c is not shown, however Employees list 222c may be another child list of parent Customers list 222a.

As shown by the data in Tables 1 and 2, Customers list 222a and Orders list 222b have a parent child relationship, in which each order record in Orders list 222b corresponds to a particular customer record in Customer record in Customers list 222a.

Importantly, data source 220 may be accessed by development tool 210 via a data source interface 215. Data source interface 215 may provide a logical view of the schema of data source 220, as described in detail in the aforementioned U.S. patent application Ser. No. 10/769,637 entitled "System and Method for Providing a Logical View of a Data Source."

Data source interface 215 may be used in connection with designer 212, which is an interface that enables the user to create, view, manage, and manipulate objects associated with a development project. Such objects may include forms and controls. A form is an object that enables the presentation of information to the user and the acceptance of input information from the user. A form may expose properties which define its appearance, methods which define its behavior, and events which define its interaction with the user. By setting its properties and writing code to respond to its events, a user may customize a form to meet the requirements of an application. A simple way to define a user interface for a form is to place controls on the form's surface.

A control is an object that is contained within a form. A control may be an object such as, for example, a data grid view, a drop down list, a combo-box, a button, or a check-box. Each type of control has its own set of properties, methods, and events that make it suitable for a particular purpose. The designer 212 enables a user to add controls to a form. For example, the designer 212 may enable a control to be added to a form by dragging and dropping the control from a toolbox, double clicking on the control in a toolbox, or selecting the control in a toolbox and lassoing an area in the form. Once a control is added to a form, the designer 212 enables the control to be aligned and positioned within the form.

An important feature of designer 212 is that objects in the designer 212 may be bound to elements within a data source. For example, a form in the designer 212 may be bound to Customers list 222a. Once bound to a particular data source element, an object may be automatically populated with the underlying data in the data source element. There are a number of methods for binding an object in the designer 212 to a data source element. For example, a data source element may be dragged from the data source interface 215 and dropped onto the object in the designer 212.

Figure 3:
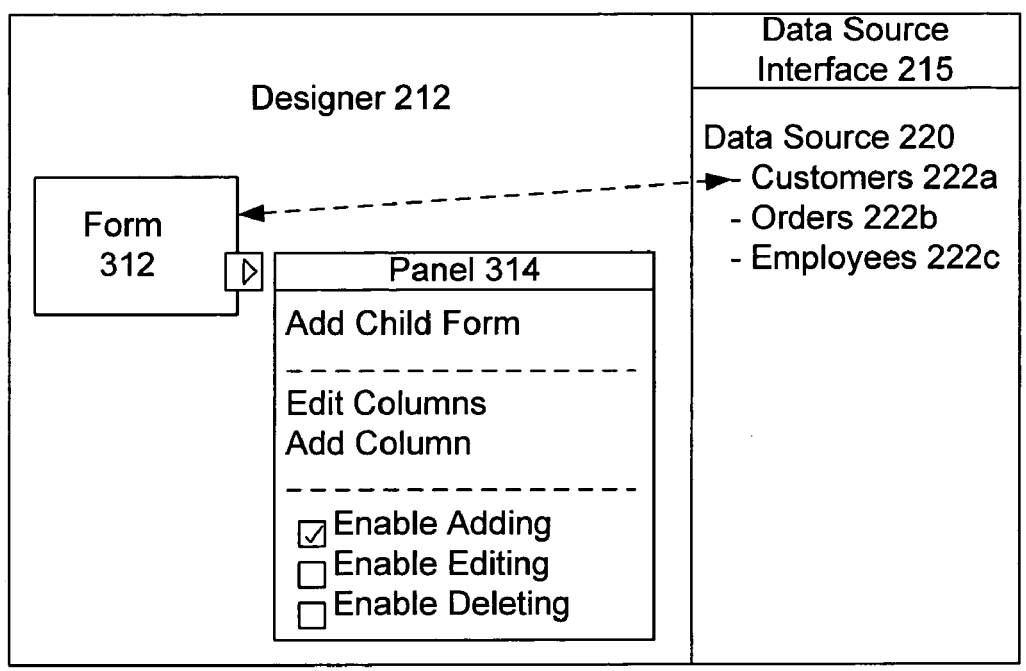
FIG. 3 shows an exemplary designer interface in accordance with the present invention.

An exemplary designer 212 in accordance with the present invention is shown in FIG. 3. Designer 212 includes form 312. Designer 212 also includes data source interface 215, which displays an exemplary schema of data source 220. Form 312 is bound to Customers list 222a within data source 220, as indicated by the dashed line shown in FIG. 3. Importantly, the schema shown in data source interface 215 is only a local schema that is stored at development tool 210. Underlying data source 220 may include additional elements that are not depicted in the local schema. Such underlying elements may be identified by directly querying a remote schema of data source 220.

Form 312 has an associated smart user interface panel 314. Such a smart user interface panel is described in the aforementioned U.S. patent application Ser. No. 10/768,522 entitled "System and Method for Exposing Tasks in a Development Environment." Generally, panel 314 exposes a set of exemplary developer tasks available in connection with form 312. One such task is the retrieve and "add child form" task. In addition to user interface panel 430, the "add child form" task may also be exposed using, for example, a traditional menu bar or a context menu.

Figure 4:
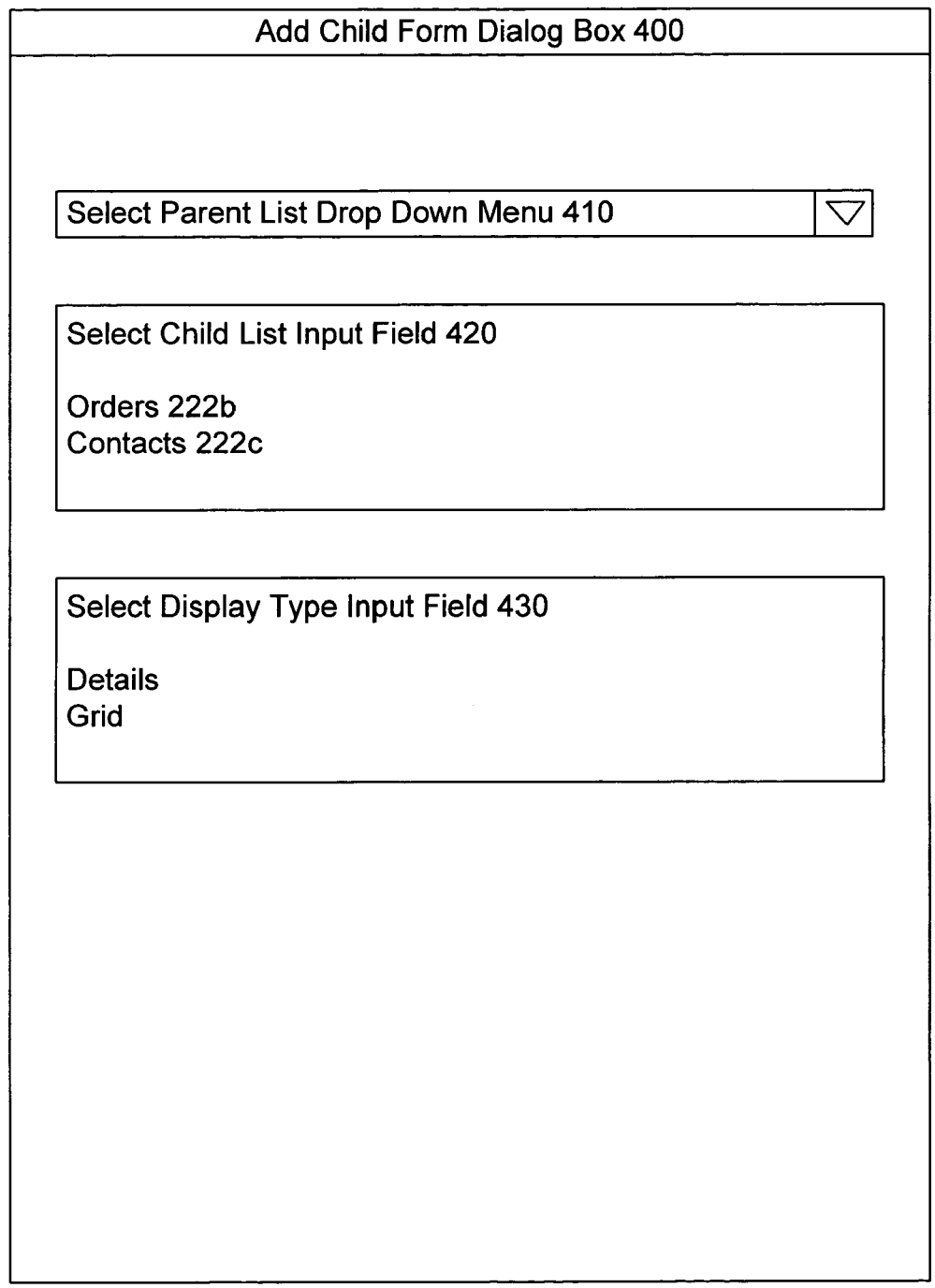
FIG. 4 shows an exemplary add child dialog box in accordance with the present invention.

In response to selecting the add child form task, an add child form dialog box may be displayed to the user in designer 212. Referring now to FIG. 4, exemplary add child dialog box 400 includes a select parent list drop down menu 410, which enables the user to select a parent list. As should be appreciated, in place of the drop down menu 410, dialog box 400 may include other user input fields such as, for example check boxes, radio buttons, or a cascading tree display. Because the task is launched from form 312, the default value of drop down menu 410 may be set to the list to which form 312 is bound, which, in this case, is "Customers" list 220a. Other elements displayed in drop down menu 410 may include, for example, other lists 222b and 222c within data source 220.

Dialog box 400 also includes select child list input field 420. Select child list input field 420 enables the user to select a particular child list from among a set of available child lists related to the parent list selected in drop down menu 410. An exemplary method for identifying the set of available child lists displayed in display 420 is discussed in detail below with reference to step 712 of FIG. 7.

Dialog box 400 also includes select display type input field 430. Select display type input field 430 enables the user to select a display type for the child list selected via input field 420. Select display type input field 430 includes exemplary display types that include a details display and a grid display. The details display shows each record within a set of records individually, enabling the user to scroll through each record. The grid display shows a set of records together in traditional grid form. As should be appreciated, other types of displays are contemplated in connection with the present invention and may be listed in input field 430 or another similar input field.

Figure 5:
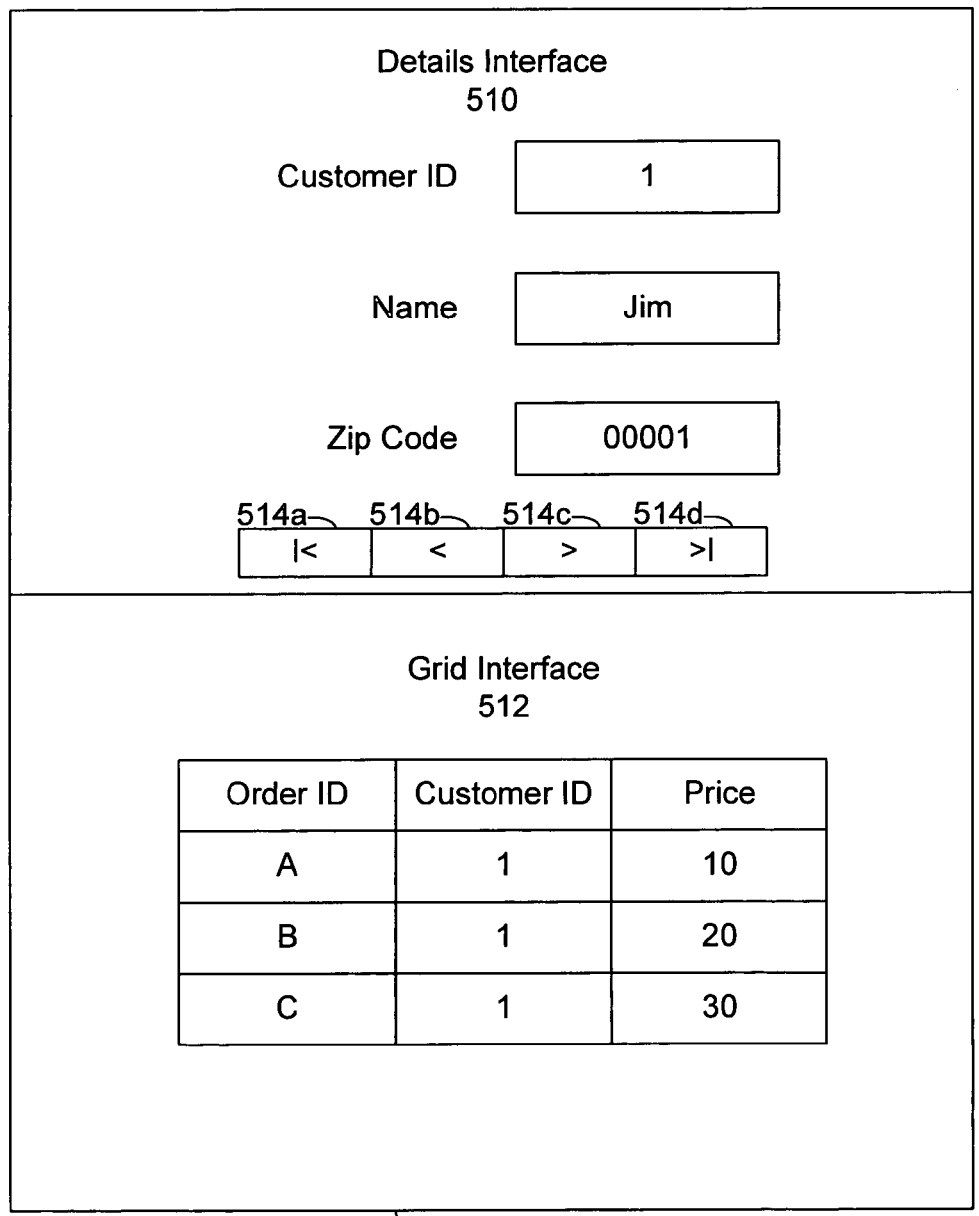
FIG. 5 shows an exemplary display for parent and child data in accordance with the present invention.

An exemplary display 500 for parent and child data in accordance with the present invention is shown in FIG. 5. Display 500 includes a details display 510 and a grid display 512. Details display 510 displays individual parent records. Grid display 512 displays child records that correspond to the individual parent record shown in details display 510.

Details display 510 includes attribute fields for "Customer ID", "Name", and "Zip Code" attributes, which correspond to the columns of Customers list 222a shown in Table 1 above. The "Customer ID" attribute field shows that the data shown in details display 512 corresponds to Customer "1".

Details display 510 includes scroll controls 514a-d, which enable the user to scroll through records stored in Customers list 222a. Individual record advance control 514c enables the user to advance to a directly following record in a list of records, while final record advance control 514d enables the user to advance to a final record in a list of records. Individual record return control 514b enables the user to return to a directly preceding record in a list of records, while initial record return control 514a enables the user to return to an initial record in a list of records.

Grid display 512 includes columns "Order ID", "Customer ID", and "Price", which correspond to the columns of Orders list 222b shown in Table 2. Importantly, grid display 222 only shows records for orders which have been placed by Customer "1".

Figure 6:
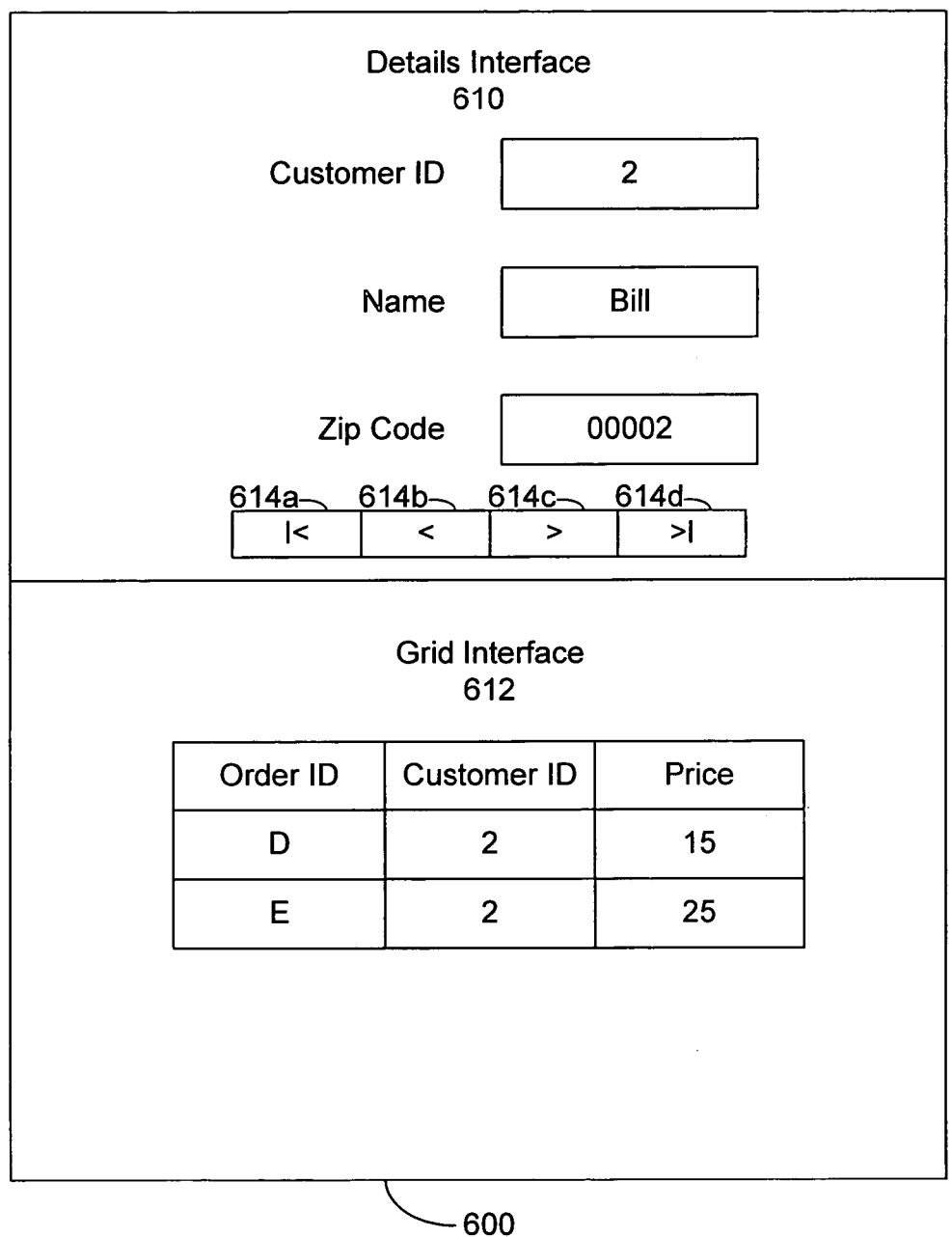
FIG. 6 shows another exemplary display for parent and child data in accordance with the present invention.

Another exemplary display 600 for parent and child data in accordance with the present invention is shown in FIG. 6. Unlike details display 510 of FIG. 5 which shows data corresponding to Customer "1", details display 610 of FIG. 6 shows data corresponding to Customer "2". Furthermore, unlike grid display 512 of FIG. 5 which shows records for orders which have been placed by Customer "1", grid display 612 of FIG. 6 shows records for orders which have been placed by Customer "2".

The user may move from details display 510 of FIG. 5 to details display 610 of FIG. 6 by, for example, clicking individual record advance navigation control 514c or final record advance navigation control 514d of FIG. 5 with an attached mouse. The user may return to details display 510 of FIG. 5 from details display 610 of FIG. 6 by, for example, clicking individual record return navigation control 614b or final record return navigation control 614 of FIG. 6 with an attached mouse.

Figure 7:
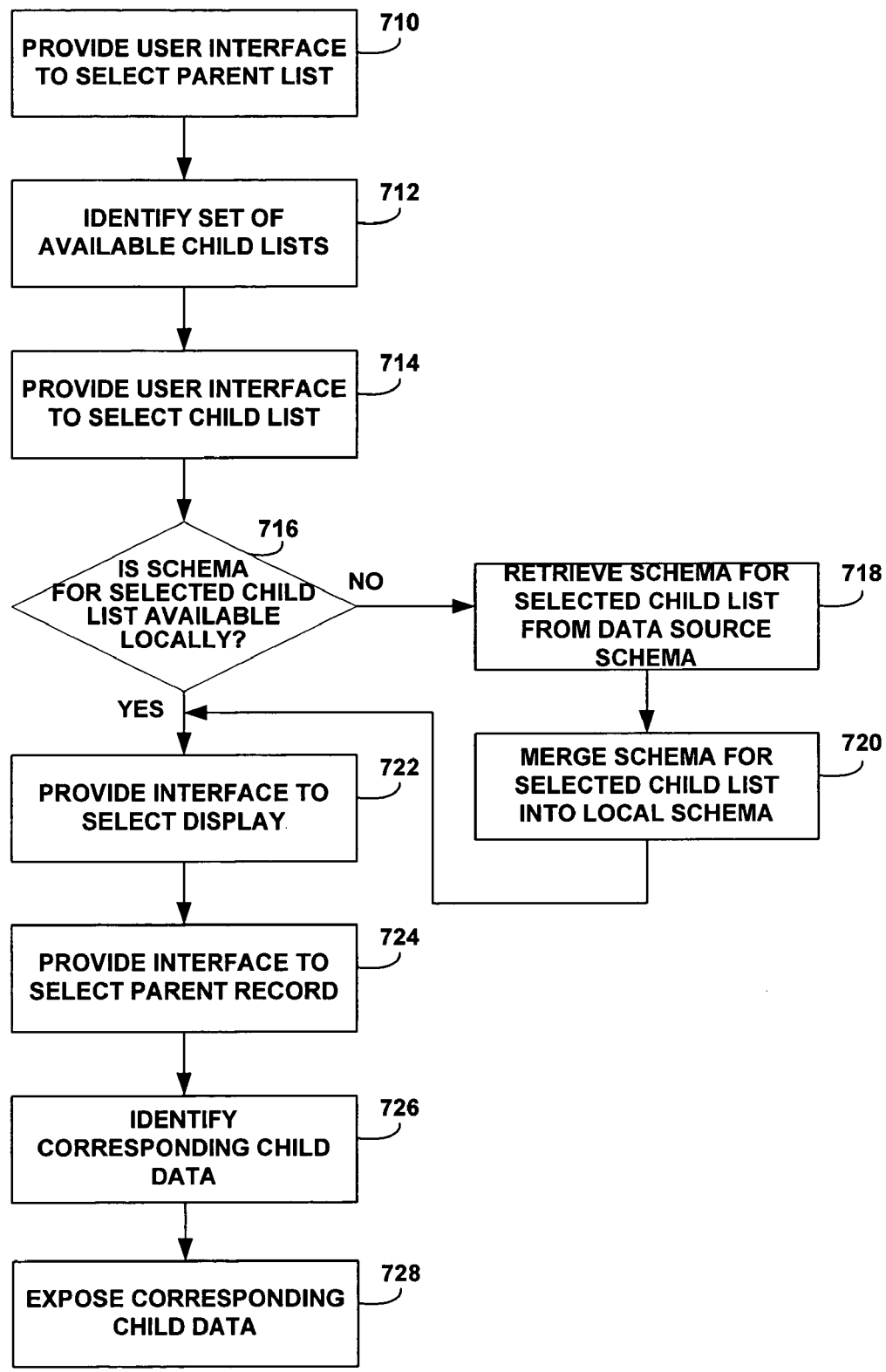
FIG. 7 shows a flowchart of an exemplary method for exposing child data in accordance with the present invention.

A flowchart of an exemplary method for exposing child data in accordance with the present invention is shown in FIG. 7. The method of FIG. 7 may be initiated, for example, by selecting the "add child for" task set forth above with respect to FIG. 3 or another similar task.

At step 710, a user interface to select the parent list is provided. The user interface may be, for example, select parent drop down menu 410 of FIG. 4. Alternatively, the parent list may be automatically identified based on context information. For example, if the add child data task is requested from form 312, then "Customers" list 222a may be automatically identified as the parent list because it is the list to which form 312 is bound.

At step 712, a set of available child lists is identified. The set includes the child lists that are related to the parent list identified at step 710. To identify the available child lists, a local version of a data source schema that is stored at development tool 210, such as the schema displayed in data source interface 215 of FIG. 3, may be examined. Additionally, a remote schema at the underlying data source 220 may also be examined to identify additional child lists not included in the local data source schema.

At step 714, a user interface to select a child list is provided. The user interface preferably displays the set of available child lists identified at step 712 and enables the user to select a particular child list from the set. The user interface may be, for example, select child list input field 420 of FIG. 4.

At step 716, it is determined whether the schema for the selected child list is available locally. If the schema for the selected child list is not available locally, then, at step 718, the schema for the selected child list is retrieved from data source 220.

At step 720, the schema for the selected child list may be merged into the local data source schema stored at development tool 210. Step 720 is an optional step. A dialog box may be displayed to the user which asks the user if she wishes to merge the schema for the selected child list into the local data source schema. The changing of the local schema may trigger designer 212 to regenerate code that it produces from the local schema.

At step 722, an interface to select a display type for the child list is provided. Such an interface may be, for example, select display type input field 430 of FIG. 4. The display type may be, for example, a details display or a grid display. Exemplary details displays 510 and 610 and grid displays 512 and 612 are discussed in detail with reference to FIGS. 6 and 7 above.

At step 724, an interface to select a particular parent record is provided. The selected parent record is the parent record for which to retrieve child data. The interface may be, for example, details display 610 and 710 of FIGS. 6 and 7, which enable the user to select a particular parent record using scroll controls 614*a-d* and 714*a-d*, respectively. Alternatively, a parent record may be selected from a grid display, for example, clicking on the record with an attached mouse.

At step 726, child data records corresponding to the selected parent record are identified. The corresponding child data records may be identified by, for example, explicitly defining a relationship between the parent and child lists within development tool 210. Specifically, a key attribute that may be used to cross reference child data may be defined. For example, "Customer ID" is a key attribute of Customer list 222*a* that may be cross referenced against Orders list 222*b* to determine orders placed by a particular customer.

The corresponding child data records may also be identified by, for example, determining query parameters based on the attributes of the selected portion of the parent list, generating parameterized code including the query parameters; and querying the child list with the parameterized code. For example, if customer "1" is selected from parent Customers list 222*a* as shown in display 500 of FIG. 5, then child orders list 222*b* may be queried with "Customer ID=1" as a query parameter.

At step 728, corresponding child data records are exposed to the user. In addition to generating an interface to display the child data records, all the components and code required to retrieve the child data from data source 220 are generated. The records may be exposed using the display type selected by the user at step 722. Once the child data is displayed, the user may, for example, view and edit data as desired for an application with which she is working. Any modifications made to the data may optionally be propagated back to the data source 220. The user may also perform further tasks and operations on the child data as made available by development tool 210.

CONCLUSION

Thus, exemplary systems and methods for exposing child data have been disclosed. As set for the above, a simple user interface may enable the user to select a parent list, to view a set of available child lists corresponding to the selected parent list, and to select a particular child list from the set of available child lists. The set of available child lists may be automatically compiled in response to the selection of the parent list. If the selected child list is not included in a local schema, a data source schema that includes the selected child list may be optionally merged into the local schema. Another user interface may be provided that enables the user to select a particular portion of the parent list for which to view corresponding child data. The corresponding child data may be automatically obtained in response to the selection of the portion of parent the list.

While the present invention has been described in connection with the preferred embodiments of the various figures, it is to be understood that other similar embodiments may be used or modifications and additions may be made to the described embodiment for performing the same function of the present invention without deviating therefrom. For example, the parent and child lists may be displayed separately rather than in a single interface. Therefore, the present invention should not be limited to any single embodiment, but rather should be construed in breadth and scope in accordance with the appended claims.

What is claimed:

1. A method for exposing a child list that is related to a parent list, the method comprising:

displaying a form in a designer interface within a development environment, wherein the development environment provides a data source interface for accessing a remote data source stored remotely from the development environment, the remote data source having a remote data source schema stored at the remote data source;

binding a parent list to the form by displaying the parent list in the data source interface, dragging the parent list from the data source interface, and dropping the parent list onto the form in the designer interface;

receiving a request to add a child list to the form;

responsive to the request:
  identifying the parent list bound to the form;
  identifying a set of available child lists related to the parent list by examining a data source schema that is stored at the development environment and by querying the remote data source schema to identify a child list that is not included in the data source schema that is stored at the development environment;
  providing a user interface that enables a user to select the child list from the set of available child lists and to select a portion of the parent list for which to view a corresponding portion of the child list;

Identifying the corresponding portion of the child list at least in part by:
  a) determining query parameters based on the selected portion of the parent list:
  b) generating parameterized code including the query parameters: and
  c) querying the child list with the parameterized code:

examining a first schema that is stored locally and that comprises at least a portion of the remote data source schema to determine whether a schema for the selected child list is locally available;

using the designer interface to generate code as a function of the first schema;

upon determining that the schema for the selected child list is locally available, providing the schema for the child list to a display device for display on the display device;

upon determining that the schema for the selected child list is not locally available:
  a1) retrieving the schema for the selected child list from a second schema that is stored at the remote data source;
  b1) merging the schema for the selected child list with the first schema;
  c1) in response to merging the schema for the selected child list with the first schema, causing the designer interface to regenerate code that the designer interface generated as a function of the first schema; and
  d1) providing the merged first schema including the schema for the child list to a display device for display on the display device;

providing a parent selection interface for selecting a parent record from the parent list;

receiving, via the parent selection interface, a selection of a parent record;

identifying a plurality of child data records that correspond to the selected parent record;

generating a child record display interface for displaying the child data records that correspond to the selected parent record, code required to retrieve the child data records from the remote data source, and a component required to retrieve the child data records from the remote data source;

receiving a modification of a child data record; and propagating the modification of the child data record to the remote data source.

2. The method of claim 1, wherein identifying the set of available child lists comprises examining the first schema to identify the set of available child lists.

3. The method of claim 1, wherein identifying the set of available child lists comprises querying the second data source schema to identify the set of available child lists.

4. The method of claim 1, wherein identifying the corresponding portion of the child list further comprises:

defining the relationship between the parent list and the child list; and identifying the corresponding portion of the child list based on the defined relationship.

5. The method of claim 1, further comprising retrieving the corresponding portion of the child list from the remote data source.

6. The method of claim 1, further comprising displaying the corresponding portion of the child list in a running application.

7. A computer readable storage medium having stored thereon computer-executable instructions for performing steps comprising:

displaying a form in a designer interface within a development environment, wherein the development environment provides a data source interface for accessing a remote data source stored remotely from the development environment, the remote data source having a remote data source schema stored at the remote data source;

binding a parent list to the form by displaying the parent list in the data source interface, dragging the parent list from the data source interface, and dropping the parent list onto the form in the designer interface;

receiving a request to add a child list to the form;

responsive to the request:

identifying the parent list bound to the form based on context information;

identifying a set of available child lists related to the parent list by examining a data source schema that is stored at the development environment and by querying a remote data source schema to identify a child list that is not included in the data source schema that is stored in the development environment;

providing a user interface that enables a user to select the child list from the set of available child lists and to select a portion of the parent list for which to view a corresponding portion of the child list;

identifying the corresponding portion of the child list at least in part by:

a) determining query parameters based on the selected portion of the parent list;

b) generating parameterized code including the query parameters; and c) querying the child list with the parameterized code;

examining a first schema that is stored locally and that comprises at least a portion of the remote data source schema to determine whether a schema for the selected child list is locally available;

using the designer interface to generate code as a function of the first schema;

upon determining that the schema for the selected child list is not locally available:

a1) retrieving the schema for the selected child list from a second schema that is stored at the remote data source;

b1) merging the schema for the selected child list with the first schema;

c1) in response to merging the schema for the selected child list with the first schema, causing the designer interface to regenerate code that the designer interface generated as a function of the first schema;

d1) providing the merged first schema including the schema for the child list to a display device for display on the display device;

providing a parent selection interface for selecting a parent record from the parent list;

receiving, via the parent selection interface, a selection of a parent record;

identifying a plurality of child data records that correspond to the selected parent record;

generating a child record display interface for displaying the child data records that correspond to the selected parent record, code required to retrieve the child data records from the remote data source, and a component required to retrieve the child data records from the remote data source;

receiving a modification of a child data record; and propagating the modification of the child data record to the remote data source.

8. The computer readable storage medium of claim 7, wherein identifying the set of available child lists comprises examining the first schema to identify the set of available child lists.

9. The computer readable storage medium of claim 7, wherein identifying the set of available child lists comprises querying the second data source schema to identify the set of available child lists.

10. The computer readable storage medium of claim 7, wherein identifying the corresponding portion of the child list further comprises:

defining the relationship between the parent list and the child list; and identifying the corresponding portion of the child list based on the defined relationship.

* * * * *